United States Patent [19]

Towsend

[11] 4,203,101
[45] May 13, 1980

[54] ELECTRIC POWER INTERRUPTING APPARATUS

[76] Inventor: Marvin S. Towsend, 1365 Potomac Heights Dr., Oxon Hill, Md. 20022

[21] Appl. No.: 16,196

[22] Filed: Feb. 28, 1979

Related U.S. Application Data

[63] Continuation-in-part of Ser. No. 758,395, Jan. 11, 1977, abandoned.

[51] Int. Cl.² ............................................. G08B 21/00
[52] U.S. Cl. ................................. 340/635; 200/61.85; 219/250; 219/257; 340/655
[58] Field of Search ............... 340/635, 640, 644, 655, 340/664, 686; 200/61.52, 61.47, 61.85; 219/243, 248, 250, 252, 256, 257, 507, 509; 361/179, 181

[56] References Cited

U.S. PATENT DOCUMENTS

| | | | |
|---|---|---|---|
| 1,284,104 | 11/1918 | Heylman | 219/257 |
| 1,350,933 | 8/1920 | Oca-Balda | 219/257 X |
| 1,521,748 | 1/1925 | Brey | 200/61.85 X |
| 1,551,091 | 8/1925 | Dworkin | 200/61.52 X |
| 1,562,552 | 11/1925 | Hanley | 200/61.85 X |
| 1,573,801 | 2/1926 | Bown | 340/539 |
| 1,683,252 | 9/1928 | Madigan | 219/257 X |
| 1,981,309 | 11/1934 | Crossland et al. | 219/257 |
| 2,833,903 | 5/1958 | Waddell | 200/61.85 X |
| 3,424,894 | 1/1969 | Schwartz et al. | 219/252 |
| 3,827,040 | 7/1974 | Simmons | 361/191 X |

*Primary Examiner*—John W. Caldwell, Sr.
*Assistant Examiner*—Daniel Myer

[57] ABSTRACT

A sensor controlled device for interrupting electric power to a portable electric clothes iron. Two sensors are attached to the handle of the iron. These sense skin contact of the operator and horizontal orientation of the iron. The sensors control circuitry which controls a switching circuit which then controls a power connecting means, such as a relay, for shutting off power to the iron. The switching circuit may also control an electronic timer and an alarm.

13 Claims, 6 Drawing Figures

FIG. 2A
FIG. 2B
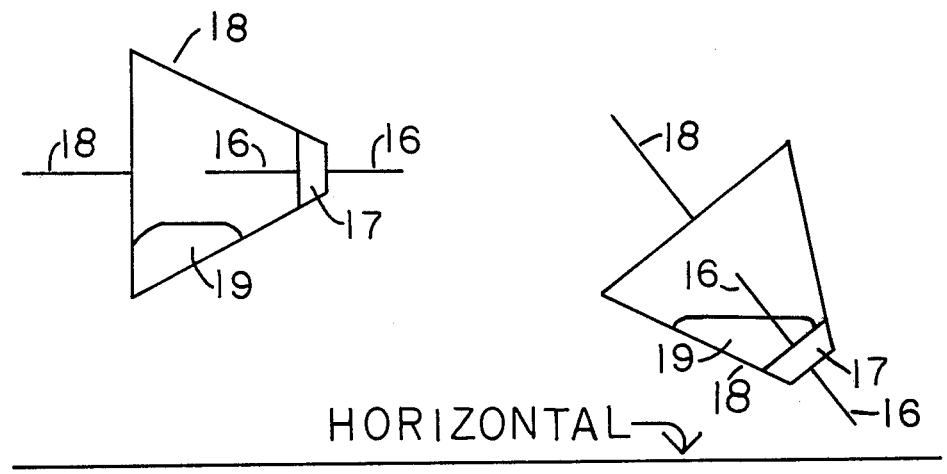
FIG. 3
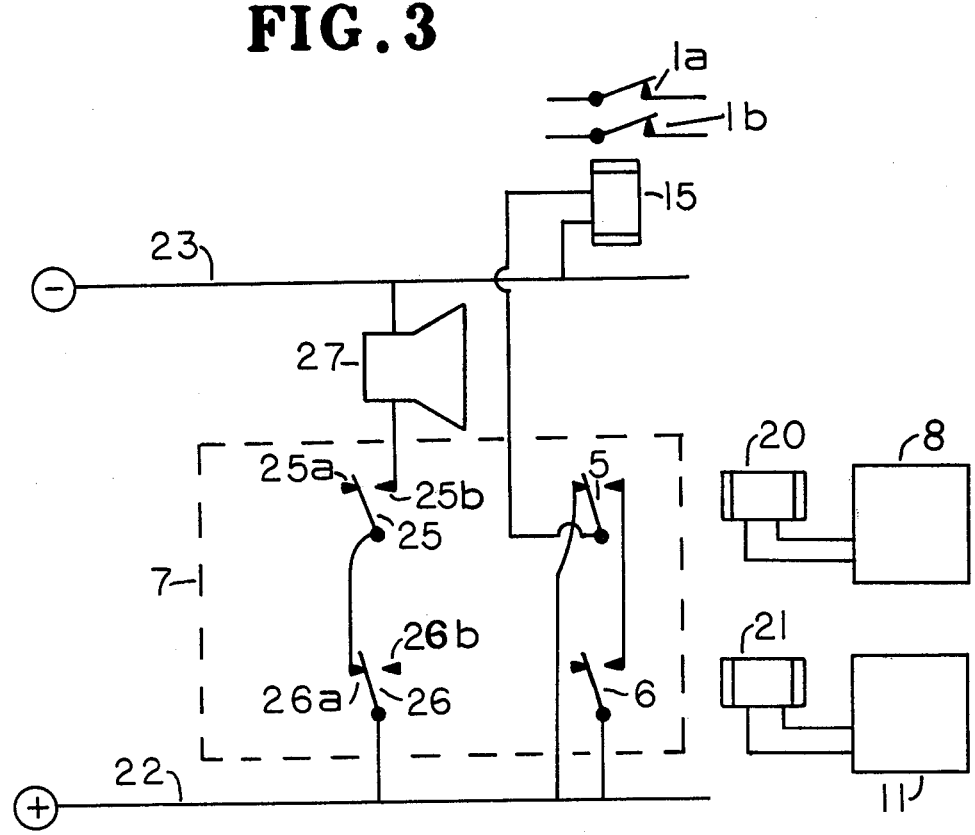

ELECTRIC POWER INTERRUPTING APPARATUS

CROSS REFERENCE TO RELATED APPLICATION

This application is a continuation-in-part of prior application Ser. No. 758,395, filed Jan. 11, 1977, now abandoned.

BACKGROUND OF THE INVENTION

The prior art of portable electric clothes irons shows a variety of safety means which have been integrally designed into the construction of the iron for interrupting the flow of electric power to the heating elements when certain potentially unsafe conditions occur. Conditions leading to an interruption of electric power to the heating elements include release of the operator's hand pressure from the handle of the iron while the iron is oriented horizontally and completion of a timed interval, timed by a mechanical mechanism, when the iron is in tilted position, not held by the operator, while power to the heating element is "on".

A survey of presently available portable clothes irons offered for sale, however, reveals that no model of iron is presently marketed incorporating both of the two integrally designed safety features just described.

Furthermore, the prior art does not show any apparatus designed to work in combination with any typical electric clothes iron so that the combination of the iron with the added-on apparatus would provide safety features responsive to the potentially unsafe conditions just described.

In addition, none of the prior art teaches the use of an electric power interrupting means which depends upon the sensing of the absence of mere hand contact for shutting off the power to the heating elements of the iron.

An objective of the present invention, therefore, is to provide a novel electric power interrupting means whose power interrupting function depends upon both the mere contact of the hand of the operator and the orientation of the iron itself; said electric power interrupting means can be integrally designed into the structure of the portable electric clothes iron.

A second objective of the present invention is to provide an apparatus for converting any typical portable electric clothes iron into a safer appliance having an electric power interrupting means responsive to the potentially unsafe condition of releasing the handle of the iron while it is in the horizontal position.

A third objective of the invention is to provide an electric power interrupting means which shuts off power to the iron when the iron is in a tilted position and is not held by the operator, and therefore not in contact with the skin of the operator, for a predetermined period of time.

A fourth objective of the invention is to provide an electric power interrupting means having an audible alarm which sounds when the operator releases the handle of the iron in the horizontal position.

A fifth objective of the invention is to provide an electric power interrupting apparatus having an electric power connecting means, means for sensing operator's release of the handle of the iron while it is horizontal, and an audible alarm which sounds when operator's hand releases iron handle while it is horizontal, and an electronic timing circuit which de-energizes the electric power interrupting means when a predetermined time interval expires while the iron rests in a tilted position without the operator's holding the handle of the iron.

A sixth objective of the invention is to provide an electric power interrupting apparatus having an electric power connecting means, means for sensing operator's release of the handle of the iron while it is horizontal, an audible alarm which emits sound when the operator's hand releases the handle of the iron while it is horizontal, and an electronic timing circuit which de-energizes the electric power connecting means and de-energizes the audible alarm when a predetermined time interval expires while the iron rests in a tilted position without the operator's holding of the iron.

SUMMARY OF THE INVENTION

The invention is a sensor controlled electric power interrupting means for a portable electric clothes iron, comprising: an AC power connecting means, such as a relay, whose contacts are in series with an AC power source and the heating elements of the iron; an AC-DC converter; a touch sensor sensing hand skin contact attached to the handle of the iron and its associated control circuitry and control switches; an orientation sensor attached to the iron and its associated control circuitry and control switches; and a switching circuit comprised of the touch circuit controlled switches and the orientation circuit controlled switches for controlling the operative state of the AC power connecting means.

Further embodiments of the invention may be additionally comprised of: an audible alarm which sounds when the operator releases the handle of the iron while it is in a horizontal orientation; and an electronic timing circuit which causes the electric power to the iron to be shut off when the iron is in a tilted position for a predetermined length of time, and which also causes the power to the audible alarm to be shut off as well.

Another aspect of the invention is providing an electric power interrupting apparatus for converting any typical portable electric clothes iron into a safer appliance by placing said sensor controlled electric power interrupting means in a housing which has a receptacle for receipt of the AC power plug of the iron, and which also has a plug for insertion into an AC power souce.

The novel features characteristic of the invention both as to its organization, method of operation, and methods of application together with additional objectives, features and advantages thereof will best be understood by the description presented below when read in connection with the accompanying drawing.

Although several specific embodiments of the invention have been selected for illustration in the drawing, and although the description presented below relates especially to the specific illustrated embodiments of the invention, this description is not intended to limit the scope of the invention which is defined in the claims.

DESCRIPTION OF THE DRAWING

FIGS. 2A and 2B show an orientation sensor in a horizontal and in a tilted orientation, respectively.

FIG. 3 illustrates an embodiment of the invention which includes an audible alarm.

DETAILED DESCRIPTION OF THE INVENTION

Figure 1:
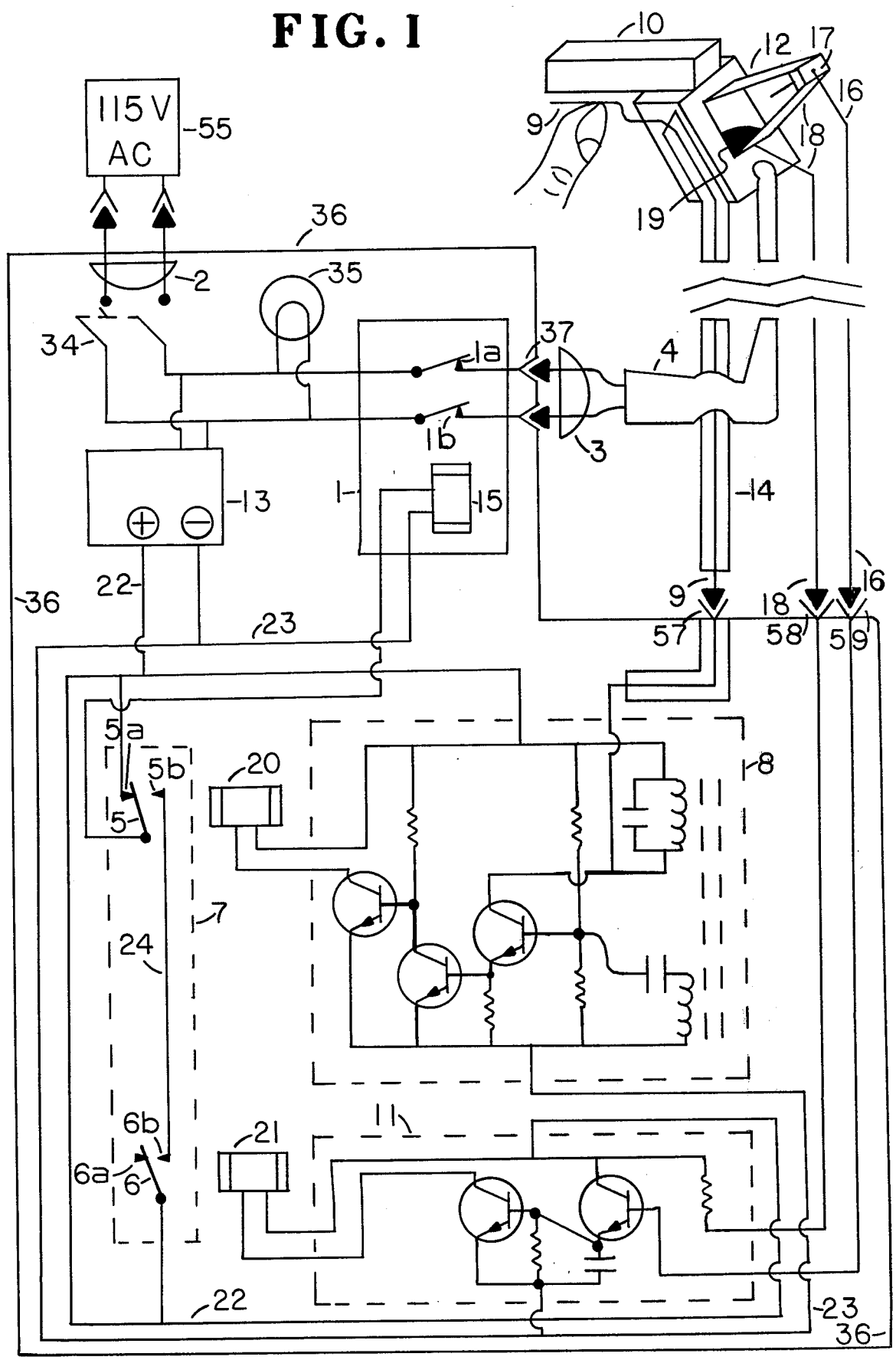
FIG. 1 illustrates a simple embodiment of the invention.

In FIG. 1, an AC power connecting relay 1 has its contacts 1a and 1b in series between AC power sorce 55 and the heating elements of the portable electric clothes iron, not shown but understood to be at the terminus of electrical cord 4. When the coil 15 of the power connecting relay 1 is energized, the relay contacts 1a and 1b are closed allowing power to flow to the iron. When the coil 15 of the relay 1 is de-energized, the relay contacts 1a and 1b open, and no power flows to the iron.

The operative state of the power connecting relay 1 is controlled by first touch-circuit-controlled-switch 5 and first orientation-circuit-controlled-switch 6 forming in combination an electrically actuated switching circuit 7. First touch-circuit-controlled switch 5 is controlled by a first electrically powered switch actuator, relay coil 20, which is energized and de-energized by touch circuit 8. Touch circuit 8 de-energizes relay coil 20, which is normally energized, when a touch sensor 9 is touched. Touch sensor 9 is attached to the handle 10 of the iron in a position such that it is touched when the handle of the iron is gripped by the operator. Touch circuitry 8 is a capacitance-controlled switching circuit which changes state when the capacitance of the body of the operator is connected to the circuit by the operator's hand skin contacting touch sensor 9. First orientation-circuit-controlled-switch 6 is controllted by a second electrically powered switch actuator, relay coil 21, which is energized by orientation circuit 11 which is activated by an orientation sensor 12 attached to the iron.

An AC-DC converter 13 is used for supplying DC power, by positive line 22 and negative line 23, to the coil 15 of power connecting relay 1, to the touch circuit 8, and to the orientation circuit 11.

Two other elements illustrated in FIG. 1 are very useful in providing for a practical embodiment of the invention. These elements are "on-off" switch 34 and pilot lamp 35. When "on-off" switch 34 is in "off" position, no power flows to either the DC control circuitry or the AC iron power circuitry. When "on-off" switch 34 is in the "on" position, pilot lamp 35 is lit and power is supplied to the DC control circuitry and to the switching circuit 7 allowing AC power to flow to the iron.

In FIG. 1, an iron handle 10 with a touch sensor 9 and an orientation sensor 12 are shown. The touch sensor 9, in its simplest form, is merely an insulated wire conductor whose insulation 14 is removed at the handle of the iron exposing bare wire 9 which contacts the hand skin of the operator when the handle of the iron is held by the operator.

In FIGS. 2A and 2B close-ups of the orientation sensor 12 are shown. FIG. 2A shows the orientation sensor in the horizontal orientation. The orientation sensor 12 is in effect a SPST switch having a rod-like first contact 16 inserted through an insulating ring 17 and insulated from a conical second contact 18 which also serves as a housing for retaining a drop of liquid mercury 19. FIG. 2B shows the orientation sensor in the tilted position. When the iron is tilted from the horizontal position, the normally open switch is closed as the drop of mercury 19 flows to the apex of the conical housing and connects contact 16 with contact 18. When a sensor controlled electric power interrupting means of the invention is integrally designed into the structure of the iron, then the power cord 4 of the iron would be plugged directly into AC power source 55.

However, when an apparatus is provided for converting any typical portable electric clothes iron into a safter appliance of the invention, then a housing 36 is provided in which is placed the sensor controlled electric power interrupting means of the invention. The housing 36 has an AC power plug 2 which plugs into the AC power source 55. The housing 36 also has a receptacle 37 for receipt of connector 3 of the electrical cord 4 of the iron. In addition, the housing 36 has jacks 57, 58 and 59 for receiving the conductorsof the touch and orientation sensors, respectively.

In the operation of the invention, two sets of alternate cases are possible. The first set of cases to be discussed is when the touch sensor 9 is being touched by the operator. Reference is made to FIG. 1. When touch sensor 9 is touched, touch circuit 8 causes relay coil 20 to be energized thereby allowing switch 5 to contact switch contact 5a. With switch 5 in contact with switch contact 5a, a circuit is completed from positive line 22 through switch contact 5a and switch 5 to the coil 15 of the power connecting relay 1 and to negative line 23. Thereby, then contacts 1a and 1b of the relay 1 are held closed allowing power to flow to the iron. With switch 5 in contact with switch contact 5a, the position of switch 6 has no effect on the operative state of the power connecting relay 1. Power flow to the iron is maintained when the touch sensor 9 is touched by the operator whether the orientation of the iron is horizontal or tilted.

In the operation of the invention, the second set of alternate cases to be discussed assumes that the touch sensor 9 is not being touched by the operator. When the touch sensor 9 is not being touched, touch circuit 8 is energizing relay coil 20 thereby causing switch 5 to contact switch contact 5b. With switch 5 contacting switch contact 5b, the operative state of power connecting relay 1 is dependent upon switch 6 which depends on the orientation of the iron and orientation circuit 11.

In the first case, when the iron is horizontal, relay coil 21 is de-energized allowing switch 6 to contact switch contact 6a. Contact 6a is open thereby preventing energizing of coil 15 of relay 1 through the switching circuit 7. Therefore, when the handle is not touched by the operator and the iron is in a horizontal position, the coil 15 of power connecting relay 1 will be de-energized, and no power will flow to the iron.

In the second case, the iron is tilted and once again the touch sensor 9 is not being touched by the operator. Relay coil 21 is energized by the orientation circuit 11. Inside the orientation sensor 12, a mercury drop 19 connects contact 16 with contact 18. With relay coil 21 energized, first orientation circuit controlled switch 6 is in contact with switch contact 6b allowing completion of a circuit from positive line 22, through switch 6 and switch contact 6b, through conductor 24 to contact 5b, through first touch circuit controlled switch 5 to the coil 15 of relay 1, and to negative line 23. In this way, the coil 15 of relay 1 is energized causing its relay contacts 1a and 1b to close thereby permitting power to flow to the iron.

Another embodiment of the invention is illustrated in FIG. 3 where the elements of the invention shown in FIG. 1, 2A, and 2B are understood to be the same with the following additions as noted. Switching circuit 7 is expanded to include two additonal electrically actuated switching means, second touch circuit controlled switch 25 and second orientation circuit controlled switch 26. Second touch circuit controlled switch 25 is controlled by relay coil 20, and second orientation circuit controlled switch 26 is controlled by relay coil 21. An audible alarm 27 is connected between negative line 23 and switch contact 25b. The audible alarm 27 will sound when two conditions are met simultaneously; that is, when the touch sensor 9 is not being touched by the operator and when the iron is in the horizontal position. The current energizing the audible alarm 27 passes from negative line 23, through the audible alarm 27, through switch contct 25b, switch 25, conductor 28, switch contact 26a, switch 26, and positive line 22. Thus, the audible alarm 27 is an additonal safety feature in that it sounds when the potentially unsafe condition of leaving the iron unattended when it is in the horizonal position occurs.

When the iron is in a tilted position or when the touch sensor 9 is touched, the alarm will not sound owing to the fact that the second touch circuit controlled switch 25 and the second orientation circuit controlled switch 26 in switching circuit 7 do not provide a complete circuit through the alarm.

Figure 4:
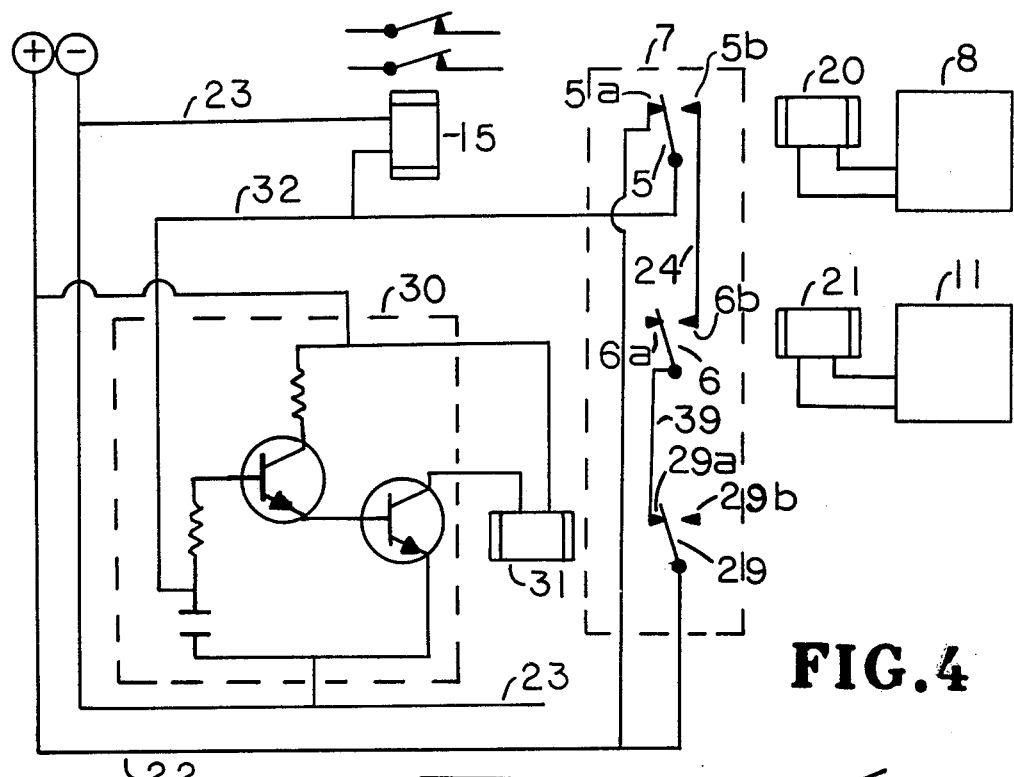
FIG. 4 illustrates an embodiment of the invention which includes an electronic timing circuit.

Another embodiment of the invention is illustrated in FIG. 4 where the elements of the invention shown in FIG. 1 are understood to be the same with the following additions as noted. Switching circuit 7 is expanded to include one additional electrically actuated switching means, first electronic timer circuit controlled switch 29. An electronic timing circuit 30 is introduced which energizes electrically powered switch actuator, relay coil 31, which controls switch 29. A conductor 32, the reset wire, connects the timer to the pole of switch 5. As long as switch 5 contacts switch contact 5a (that is when touch sensor 9 is being touched), the timer is being reset. When switch 5 moves to switch contact 5b (that is when the operator releases the handle of the iron), the timer 30 begins to run for its predetermined length of time. As the timer 30 runs, relay coil 31 is energized causing switch 29 to rest on switch contact 29a. If the iron handle is released in a tilted position, the iron will receive power as long as the timer 30 is running. When the timer 30 is running and the iron left is unattended in tilted position, the coil 15 of the power connecting relay is energized by the following complete circuit. The current flows from positive line 22 through first electronic timer circuit controlled switch 29, switch contact 29a, conductor 39, first orientation circuit controlled switch 6, switch contact 6b, conductor 24, switch contact 5b, first touch circuit controlled switch 5, the coil 15 of power connecting relay 1, and negative line 23. When the timer stops after its predetermined length of time, relay coil 31 is de-energized, switch 29 moves to switch contact 29b; and the resulting open circuit causes the coil 15 of power connecting relay 1 to be de-energized thereby shutting off power to the iron. The electronic timer circuit 30, along with relay coil 31 and switch 29, provides an additional safety feature of shutting off the power to the iron when the iron is left "on" while in the tilted position for a predetermined length of time.

Figure 5:
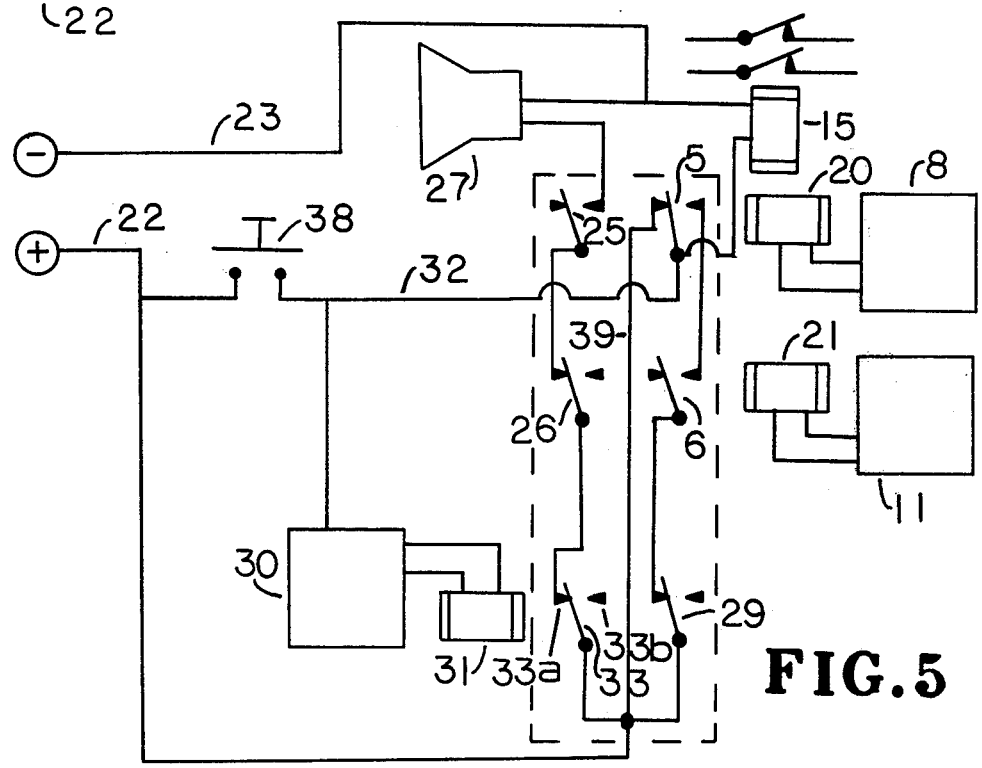
FIG. 5 illustrates an embodiment of the invention which includes both an audible alarm and an electronic timing circuit.

Another embodiment of the invention is illustrated in FIG. 5 where the elements of the invention shown in FIG. 3 are understood to be the same with the following additions as noted. Switching circuit 7 is expanded to include two additional electrically actuated switching means, first electronic timer controlled switch 29 (as shown in FIG. 4) and second electronic timer controlled switch 33. These two switches 29 and 33 are controlled by a third electrically powered switch actuator, relay coil 31, which is controlled by electronic timer circuit 30. The effect of switch 33 is to limit the time the audible alarm 27 will sound to the predetermined length of time that timer 30 runs. When the timer 30 is running, switch 33 rests on switch contact 33a thereby allowing the alarm 27 to sound when the previously discussed necessary conditions relating to the touch sensor and the horizontal orientation sensor occur. When the timer 30 runs down, switch 33 moves to switch contact 33b thereby opening the alarm circuit and shutting off alarm 27. Therefore, in this embodiment, the timer serves two functions: controlling power to the iron when the iron is tilted and controlling power to the audible alarm when the iron is horizontal and the operator is not touching the iron handle.

Operation of the power interrupting apparatuses described above which include an electronic timing circuit requires an initialization step. After the plug connector 3 of the iron is inserted in receptacle 37 and after AC power plug connector 2 is inserted into an AC power outlet 55, it is necessary for the operator to initially touch the touch sensor 9 in order to reset the timing circuit 30. Without initialization, the timer 30 would remain off, relay coil 31 would be de-energized, switch 29 would be in contact with contact 29b, and coil 15 of power connecting relay 1 would remain de-energized.

As an alternative timer-initialization step, a momentary contact push button switch 38, as illustrated in FIG. 5, can be connected across the pole of switch 5 and positive DC line 22; switch 38 can be pressed as a "push to start" button after the plug connector 3 of the iron and AC plug connector 2 have been plugged in.

The invention of a power interrupting apparatus has been described as an apparatus whose touch and orientation sensors can be easily added on to a conventional portable electric hand-held clothes iron, and whose control circuits and switching circuit can be easily housed in a housing which can plug directly into an AC power wall outlet.

The touch and orientation sensors may be installed in a single, unified support. The touch and orientation sensors may be attached to the handle of the iron by clamps or wires, or they may be attached by suitable adhesives.

The orientation sensor may depend upon the rolling of a solid metal ball to close a normally open circuit.

The audible alarm may be of constant volume with time, or it may increase its volume with time. Also, the timer may be adjustable for a variety of selectable time intervals.

It is, of course, a relatively simple matter to integrate the sensors, power connecting means, control circuits, switching circuit, electronic timer, and audible alarm of the invention into the design and manufacture of a novel electric, hand-held clothes iron with but little modification of the elements of the invention as described above.

The elements of the invention such as the AC power connecting means, the sensors, the control circuits, the switching circuit, the electronic timer, and the audible alarm may be combined to form an AC power interrupting circuit which could find utility in controlling other hand-held portable appliances besides an electric clothes iron. Furthermore, such an AC power interrupting circuit of the invention could be used to control any device or appliance whose safe operation depends on both the operator's body contact and a predetermined special orientation of the device itself or of the operator or of any other object to which an orientation sensor can be attached.

Hereinbefore, the embodiments of the invention described and illustrated show the employment of relays having relay coils and relay switches. However for purposes of economy of materials, space, manufacture, and cost, equivalent solid-state electrically controlled switch actuators, a solid-state switching circuit, and solid-state AC power connecting means may be substituted.

In the art of electric switching, it is well known that, for switching purposes, electromechanical relays and solid-state switching devices are equivalent in many ways. Both have structural components which are electrically powered and which actuate other structural elements which serve as electrical switches. In a relay, a relay coil is electrically powered and actuates switch contacts through which electric current flows when the contacts are closed. In an NPN transistor (a representative solid-state switch) an emitter to base current actuates an emitter to collector current which flows when the emitter to base bias is in a predetermined switching range.

Both relays and solid-state switches have, therefore, electrically powered switch actuators and electrically actuated switching means.

In the embodiments of the invention described herein, the touch sensor has been shown to be an electrical conductor which responds to skin contact and thereby the capacitance of the operator, and which controls a capacitance controlled circuit which controls switching means in the switching circuit. However, using the principles of the invention, one might readily substitute the above mentioned touch sensor and touch circuit with a touch or proximity sensor and circuit dependent upon other physical parameters which are changed by the absence or presence of the operator's touch or proximity. Such alternate parameters could include a change in magnetic flux, a change in the absorption of radiant energy, or a change in pressure applied by the operator's hand.

What is claimed is:

1. An AC power interrupting means for a hand-held appliance, comprising:
   a. a DC power supply;
   b. an AC power connecting means;
   c. an electrically actuated switching circuit for controlling said AC power connecting means which is powered by said DC power supply and which is controlled by a first touch circuit controlled switching means and a first orientation circuit controlled switching means in said electrically actuated switching circuit;
   d. a touch sensor and a touch circuit powered by said DC power supply for controlling said first touch circuit controlled switching means by means of a first electrically powered switch actuator in said touch circuit; and
   e. an orientation sensor and orientation circuit powered by said DC power supply for controlling said first orientation circuit controlled switching means by means of a second electrically powered switch actuator in said orientation circuit.

2. An AC power interrupting means for a hand-held appliance as described in claim 1 wherein:
   a. said first touch circuit controlled switching means is a relay switch; and wherein said first electrically powered switch actuator is a relay coil which is part of said touch circuit; and
   b. said first orientation circuit controlled switching means is a relay switch and wherein said second electrically powered switch actuator is a relay coil in said orientation circuit.

3. An AC power interrupting means for a hand-held appliance as described in claim 1 wherein said electrically actuated switching means in said switching circuit are comprised of solid-state switches and wherein said electrically powered switch actuators in said touch circuit and in said orientation circuit are solid-state switching actuators.

4. An AC power interrupting means as described in claim 1 wherein said touch circuit is a capacitance-controlled circuit, and wherein said touch sensor is an electrical conductor.

5. An AC power interrupting means for a hand-held appliance as described in claim 1 wherein said orientation sensor is a liquid mercury switch.

6. An AC power interrupting means for a hand-held appliance as described in claim 1 wherein:
   a. said electrically actuated switching circuit is comprised of relay switches;
   b. said touch circuit and said orientation circuit include relay coils for actuating said relay switches;
   c. said touch circuit is a capacitance-controlled switching circuit;
   d. said touch sensor is an electrical conductor; and
   e. said orientation sensor is a liquid mercury switch.

7. An electric power interrupting apparatus for a hand-held electric appliance having a handle, an electric power cord, and a plug connector, comprising:
   a. an AC power interrupting means for connecting an AC power source with the hand-held electric appliance, said AC power interrupting means being comprised of a touch sensor mounted on the handle of the appliance, an orientation sensor mounted on the appliance, a DC power supply, a touch circuit and an orientation circuit powered by said power supply a switching circuit comprised of electrically actuated switching means which are controlled by electrically powered switch actuators which are controlled by said touch circuit and said orientation circuit, and an electric power connecting means controlled by said switching circuit and powered by said DC power supply;
   b. a receptacle which receives the plug connector of the appliance power cord and which is connected to said AC power connecting means;
   c. an AC power connector plug which is connected to said AC power connecting means for insertion into an AC power source; and
   d. a housing which houses said AC power connecting means, said switching circuit, said touch circuit, said orientation circuit, and said receptacle; and from which said AC power plug projects.

8. An AC power interrupting means for a hand-held appliance, comprising:
   a. a DC power supply;
   b. an AC power connecting means;
   c. an audible alarm;
   d. an electrically actuated switching circuit for controlling said AC power connecting means and said audible alarm which are powered by said DC power supply; said AC power connecting means being controlled by a first touch circuit controlled switching means and a first orientation circuit controlled switching means in said electrically actuated switching circuit, and said audible alarm being controlled by a second touch circuit controlled switching means and a second orientation circuit controlled switching means in said electrically actuated switching circuit;

e. a touch sensor and touch circuit powered by said DC power supply for controlling said first and second touch circuit controlled switching means of an electrically powered switch actuator in said touch circuit; and f. an orientation sensor and orientation circuit powered by said DC power supply for controlling said first and second orientation circuit controlled switching means in said switching circuit by means of a second electrically powered switch actuator in said orientation circuit.

9. An electric power interrupting apparatus for a hand-held electric appliance having a handle, an electric power cord, and a plug connector, comprising:

a. an AC power interrupting means for connecting an AC power source with the hand-held electric appliance, said AC power interrupting means being comprised of a touch sensor mounted on the handle of the appliance, an orientation sensor mounted on the appliance, a DC power supply, a touch circuit and orientation circuit powered by said power supply, a switching circuit comprised of electrically actuated switching means which are controlled by electrically powered switch actuators which are controlled by said touch circuit and said orientation circuit and said electric power connecting means, and an audible alarm controlled by said switching circuit and powered by said DC power supply;

b. a receptacle which receives the plug connector of the appliance power cord and which is connected to said AC power connecting means;

c. an AC power connector plug which is connected to said AC power connecting means for insertion into an AC power source; and d. a housing which houses said AC power connecting means, said audible alarm, said switching circuit, said touch circuit, said orientation circuit, said receptacle; and from which said AC power plug projects.

10. An AC power interrupting means for a hand-held appliance, comprising:

a. a DC power supply;

b. an AC power connecting means;

c. an electrically actuated switching circuit for controlling said AC power connecting means which is powered by said DC power supply and which is controlled by a first touch circuit controlled switching means, a first orientation circuit controlled switching means, and a first electronic timer circuit controlled switching means in said electrically actuated switching circuit;

d. a touch sensor and touch circuit powered by said DC power supply for controlling said first touch circuit controlled switching means by means of an electrically powered switch actuator in said touch circuit;

e. an orientation sensor and orientation circuit powered by said DC power supply for controlling said first orientation circuit controlled switching means by means of a second electrically powered switch actuator in said orientation circuit; and f. an electronic, resettable timer powered by said DC power supply for controlling said first timer circuit controlled switching means by means of a third electrically powered switch actuator in said timer circuit.

11. An electric power interrupting apparatus for a hand-held electric appliance having a handle, an electric power cord, and a plug connector, comprising:

a. an AC power interrupting means for connecting an AC power source with the hand-held electric appliance, said AC power interrupting means being comprised of a touch sensor mounted on the handle of the appliance; an orientation sensor mounted on the appliance; a touch circuit; an orientation circuit; an electronic, resettable timer; a DC power supply; a switching circuit comprised of electrically actuated switching means which are controlled by electrically powered switch actuators which are controlled by said touch circuit, said orientation circuit, and said electronic, resettable timer; and an electric power connecting means controlled by said switching circuit and powered by said DC power supply;

b. a receptacle which receives the plug connector of the appliance power cord and which is connected to said AC power connecting means;

c. an AC power connector plug which is connected to said AC power connecting means for insertion into an AC power source; and d. a housing which houses said AC power connecting means, said switching circuit, said touch circuit, said orientation circuit, said electronic, resettable timer, and said receptacle; and from which said AC power plug projects.

12. An AC power interrupting means for a hand-held appliance, comprising:

a. a DC power supply;

b. an AC power connecting means;

c. an audible alarm;

d. an electrically actuated switching circuit for controlling said AC power connecting means and said audible alarm which are powered by said DC power supply; said AC power connecting means being controlled by a first touch circuit controlled switching means, a first orientation circuit controlled switching means, and a first electronic timer circuit controlled switching means in said electrically actuated switching circuit; said audible alarm being controlled by a second touch circuit controlled switching means, a second orientation circuit controlled switching means, and a second electronic timer circuit controlled switching means in said electrically actuated switching circuit;

e. a touch sensor and touch circuit powered by said DC power supply for controlling said first and second touch circuit controlled switching means by means of an electrically powered switch actuator in said touch circuit;

f. an orientation sensor and orientation circuit powered by said DC power supply or controlling said first and second orientation circuit controlled switching means by means of a second electrically powered switch actuator in said orientation circuit; and g. an electronic resettable timer powered by said DC power supply for controlling said first and second timer circuit controlled switching means by means of a third electrically powered switch actuator in said timer circuit.

13. An electric power interrupting apparatus for a hand-held appliance having a handle, an electric power cord, and a plug connector, comprising:

a. an AC power interrupting means for connecting an AC power source with the hand-held electric appliance, said AC power interrupting means being comprised of a touch sensor mounted on the handle of the appliance; an orientation sensor mounted on the appliance; a touch circuit; an orientation circuit; an electronic, resettable timer; a DC power supply; a switching circuit comprised of electrically actuated switching means which are controlled by electrically powered switch actuators which are controlled by said touch circuit, said orientation circuit, and said electronic, resettable timer; and an electric power connecting means and an audible alarm controlled by said switching circuit and powered by said DC power supply;

b. a receptacle which receives the plug connector of the appliance power cord and which is connected to said AC power connecting means;

c. an AC power connector plug which is connected to said AC power connecting means for insertion into an AC power source; and d. a housing which houses said AC power connecting means, said audible alarm, said switching circuit, said touch circuit, said orientation circuit, said electronic, resettable timer, and said receptacle; and from which said AC power plug projects.

* * * * *